United States Patent
Murakami et al.

[11] Patent Number: 5,944,401
[45] Date of Patent: Aug. 31, 1999

[54] OPTICAL BLOCK AND LIQUID CRYSTAL PROJECTOR

[75] Inventors: Kyoichi Murakami; Takeyo Nakagawa, both of Kanagawa; Atsushi Iwamura; Takaaki Iwaki, both of Tokyo, all of Japan

[73] Assignee: Sony Corporation, Tokyo, Japan

[21] Appl. No.: 08/995,937

[22] Filed: Dec. 22, 1997

[30] Foreign Application Priority Data

Dec. 24, 1996 [JP] Japan ................................. 8-355448

[51] Int. Cl.[6] ............................................. G03B 21/14
[52] U.S. Cl. .............................. 353/33; 353/81; 359/837
[58] Field of Search ................................ 353/31, 33, 81;
349/57, 5, 8, 9; 359/496, 497, 495, 500,
502, 831, 833, 834, 583, 638, 639, 640

[56] References Cited

U.S. PATENT DOCUMENTS

| 4,783,156 | 11/1988 | Yokota | 359/833 |
| 4,850,685 | 7/1989 | Kamakura et al. | 353/34 |
| 4,913,528 | 4/1990 | Hasegawa et al. | 359/831 |
| 5,028,121 | 7/1991 | Baur et al. | 353/84 |
| 5,446,510 | 8/1995 | Mitsutake et al. | 353/34 |
| 5,610,765 | 3/1997 | Colucci | 359/633 |
| 5,743,610 | 4/1998 | Yajima et al. | 353/33 |
| 5,749,641 | 5/1998 | Brice et al. | 353/81 |

FOREIGN PATENT DOCUMENTS

| 63-56605 | 3/1988 | Japan | 359/833 |
| 2-151801 | 6/1990 | Japan | 359/833 |
| 4-329502 | 11/1992 | Japan | 359/831 |

Primary Examiner—William Dowling
Attorney, Agent, or Firm—Jay H. Maioli

[57] ABSTRACT

An optical block which is light in weight and low in price, and has optical path distances equivalent to those obtained with glass has an outside form composed by arranging a polyhedron 8a having a surface of incidence for a blue ray B, a polyhedron 8b having a surface of incidence for a red ray R and a polyhedron 8c having a surface of incidence for a green ray G which are configured as transparent plastic members, and optical members 9a and 9b configured as dichroic filters formed as glass members. The polyhedrons 8a to 8c are coupled by way of the optical members 9a and 9b so as to compose an optical block as a monochromator prism block.

8 Claims, 5 Drawing Sheets

OPTICAL BLOCK AND LIQUID CRYSTAL PROJECTOR

BACKGROUND OF THE INVENTION

1. Field of the Invention

The present invention relates to an optical block which is suited for use in optical systems of liquid crystal projectors and so on.

2. Description of the Related Art

Displays such as projectors, television receivers and displays for computers which use light modulation means, for example, liquid crystal panels prevail nowadays in a variety of fields.

A three-panel type liquid crystal projector, for example, polarizes RGB light emitted from a light source such as a metal halide lamp or a halogen lamp into a predetermined polarized wavefront with a polarizing splitter block and then decomposes the RGB light into, R, G and with the appropriate B colors with optical elements such as dichroic mirrors. After incidence on liquid crystal panels corresponding to the colors and light modulation, the colors are composed with a dichroic block, whereby RGB light which is a colored image can be obtained as output light. The composed colored image is projected through a projector lens to a screen.

By the way, light which is emitted from an ordinary light source has two kinds of wavefronts, which can generally be classified into a P polarized component (hereinafter referred to as P wave) and an S polarized component (hereinafter referred to an S wave). Disposed in a liquid crystal projector such as that described above is a polarizing splitter block at a location before the light emitted from the light source is allowed to be incident onto the liquid crystal panels for irradiation with rays which have either of the polarized wavefront of the P wave or the S wave corresponding to polarizing plates disposed on front surfaces of the liquid crystal panels.

It is regarded that the polarizing splitter block makes it possible to effectively utilize light emitted from light sources and is effective for composing liquid crystal projectors which are to provide images having high luminance in particular.

FIG. 1 is a perspective view exemplifying a polarizing splitter block.

As shown in this drawing, a polarizing splitter block 52 is composed by cementing a plurality of prisms 52a through 52f which are made of glass: the prisms 52b and 52e constitutes composing sections of incidence, and prisms 52a, 52c, 52d and 52f constitutes composing sections of emergence. Disposed between the prisms 52b and 52c and between the prisms 52d and 52e are polarizing beam splitters (hereinafter referred to simply as PBSs) 53a and 53b which transmit the P wave and reflect the S wave, for example, whereby the P wave and the S wave are separated once by these polarizing beam splitters.

Since the prisms 52b and 52e or the prisms 52c and 52d are made of glass and have excellent heat resistance, these PBSs 53a and 53b are formed as multi-layer thin films by a method, for example, of vapor deposition or sputtering.

The prisms 52a and 52f are composed as reflecting prisms and have multi-layer films of a dielectric material formed on outside surfaces thereof which have an angle of 45-degree relative to an optical axis of a light source which is not shown in this drawing. Furthermore, wavelength plates 54a and 54b are disposed on the emergence sides of the polarizing splitter block 52 at locations before the multi-layer films of the dielectric material for polarizing incident S wave into the P wave.

Light that is polarized, for example, into the P wave by the polarizing splitter block 52 described above is made monochromatic into the three primary colors RGB as described above, subjected to light modulation and the composed, for example, by a dichroic block 60 such as that shown in FIG. 2.

The dichroic block 60 shown in FIG. 2 has an outside form composed by cementing end surfaces of four prisms 61a, 61b, 61c and 61d which are made of glass. On predetermined end surfaces of these prisms 61a to 61b, dichroic filters 62a and 62b are formed as multi-layer films, for example, by vapor deposition.

A red ray R which is incident from the prism 61a, for example, is reflected by the dichroic filter 62a, whereas a green ray G which is incident from the prism 61c is reflected by the dichroic filter 62b. A blue ray B which is incident from the prism 61b transmits through the dichroic filters 62a and 62b, whereby the rays of the three colors are composed and emerge as a colored image from the prism 61d.

The prisms 52a to 52f and the prisms 61a to 61d which compose the polarizing splitter block 52, the dichroic block 60, etc. are generally made of glass. When the prisms and the polyhedrons are made of glass, however, they require considerable working time and cost since it is necessary to polish end surfaces thereof after they are formed. Furthermore, weights of the polarizing splitter block 52 and the dichroic block 60 are increased by using glass as a material of the prisms, thereby making the projector itself heavier.

Furthermore, the PBSs 53a and 53b the dichroic filters 62a and 62b are formed on the prisms by vapor deposition, sputtering or a similar method and it is necessary to prevent a material of the films from turning to surfaces other than target surfaces when vapor deposition or sputtering is carried out on the polyhedrons.

For reducing the weights, it is considered to make the prisms 52a to 52f and the prisms 61a to 61d of a plastic material. In view of a problem of heat resistance, however, it is difficult to form the PBSs 53a and 53b and the dichroic filters 62a and 62b by vapor deposition or sputtering though the plastic material can be molded with metal dies at a low cost.

Moreover, it is possible to reduce the turning of the material of films and further reduce the weights by forming the PBSs 53a and 53b and the dichroic filters 62a and 62b on plate-like glass members without using the prisms 52a to 52f and the prisms 61a to 61d, but optical path distances are made longer than those obtained by disposing the prisms when only the plate-like glass members are used. Accordingly, there is posed a problem that an optical system is enlarged, thereby enlarging the projector itself.

SUMMARY OF THE INVENTION

In view of the foregoing, an object of the present invention is to provide an optical block of a plate-like glass member on which an optical thin film having a predetermined light transmitting characteristic is laminated, and transparent plastic members which are composed of polyhedrons, sandwich the glass member and are kept in contact with the glass member.

Another object of the present invention is to provide a liquid crystal projector for leading primary color lights separated into three corresponding liquid crystal panels to be modulated, and synthesizing the three modulated primary color lights and projecting the synthesized light. This liquid crystal projector comprises deflecting and separating means for deflecting light from a light source having fixed wavefronts; separating means for separating the light emerged from the deflecting and separating means into three primary color lights; leading means for leading each of the three separated lights to the liquid crystal panels for modulation; synthesizing means for synthesizing the modulated lights emerged from the three liquid crystal panels; and projecting means for projecting the synthesized light onto a screen. Furthermore, in this liquid crystal projector, the deflecting and separating means has the structure in that a plate-like glass member, on which an optical thin film having a light transmitting characteristic operating as a deflection beam splitter is laminated, is sandwiched and in contact with plastic members, and the synthesizing means has the structure in that a plate-like glass member, on which an optical thin film having a light transmitting characteristic as a dichroic filter is laminated, is sandwiched and in contact with plastic members.

According to the present invention, it is possible to form polyhedrons such as prisms so as to be lighter than those made of glass. Furthermore, the present invention permits omitting manufacturing steps such as a polishing step and facilitates working since prisms or polyhedrons made of a plastic material can be formed with metal dies.

Moreover, the optical block according to the present invention has a function which is substantially the same as that of an optical block composed using prisms made of glass.

The nature, principle and utility of the invention will become more apparent from the following detailed description when read in conjunction with the accompanying in which like parts are designated by like reference numerals or characters.

DETAILED DESCRIPTION OF THE EMBODIMENT

Preferred embodiment of the present invention will be described with reference to the accompanying drawings:

(1) Optical Block

Figure 3B:
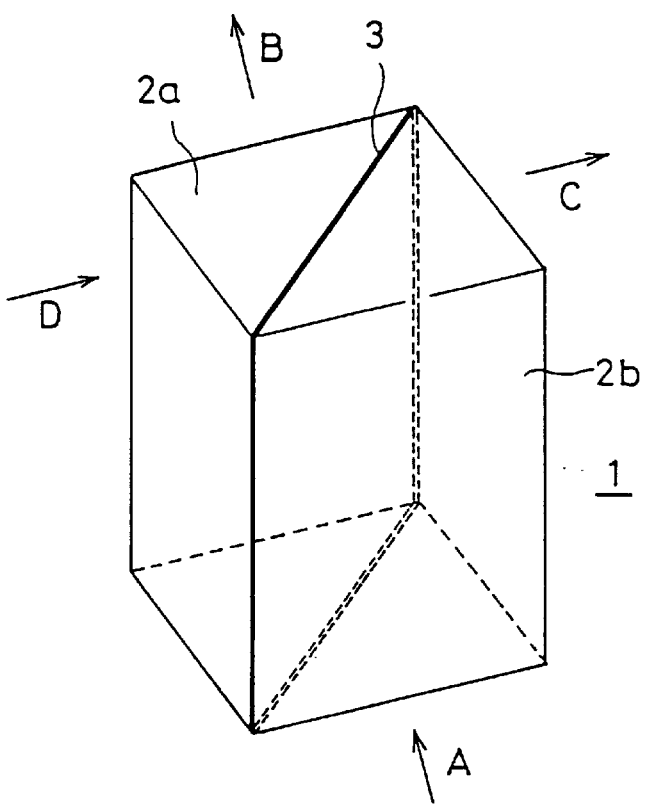
FIGS. 3A and 3B show a perspective view and a disassembled perspective view illustrating one embodiment of an optical block according to the present invention.
Figure 3A:
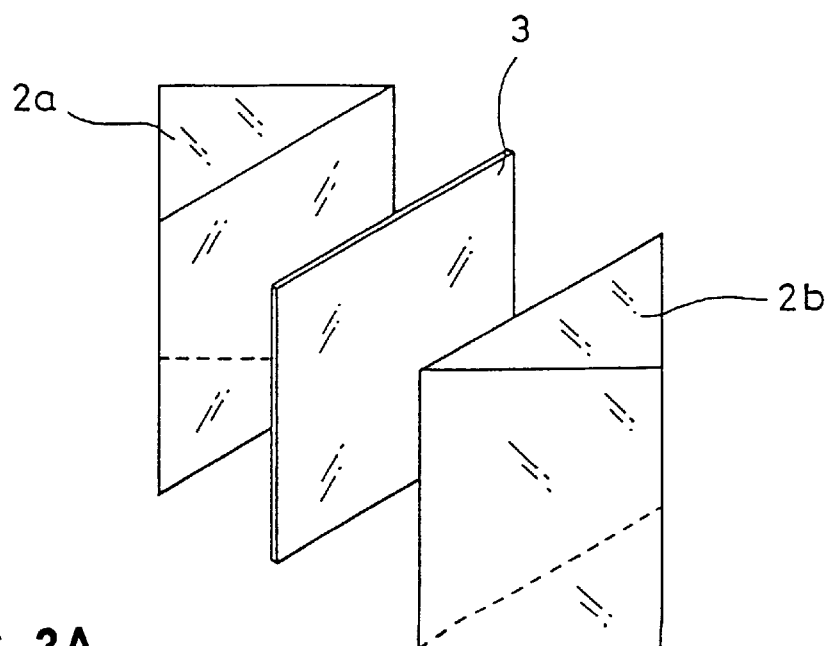

FIGS. 3A and 3B show schematic diagrams showing a compositional example of the embodiment of the optical block according to the present invention: FIG. 3A being a perspective view of the optical block and FIG. 3B being a perspective view showing the optical block in its disassembled condition.

As shown in FIGS. 3A and 3B, an optical block 1 has an outside form which is composed of a pair of prisms 2a and 2b which are configured as plastic members. The prisms 2a and 2b are made, for example, of polymethyl methacrylate (PMMA), zeonex, polycarbonate, polystyrene or a material having a characteristic improved by mixing PMMA with another material.

An optical member 3 on which an optical thin film (multilayer thin film) having a light transmitting characteristic such as a dichroic filter or a PBS is laminated is disposed as a plate-like glass member between these prisms 2a and 2b.

Since the present invention is configured to compose the optical member 3 of the plate-like glass member, it enhances heat resistance and eliminates the necessity to consider the turning at a stage to form the optical thin films on polyhedrons, thereby facilitating to form thin films by vapor deposition or sputtering. Furthermore, the present invention makes it possible to shorten back focal lengths (distances from projector lenses to light valves) by disposing the prisms 2a and 2b on both surfaces of the optical member 3.

In a case where the optical member 3 is formed so as to have a light transmitting characteristic of a PBS and the optical block 1 is configured as a polarizing splitter block, the P wave transmits in a direction indicated by an arrow B and the S wave reflects in a direction indicated by an arrow C from a random polarized light (P+S waves) incident in a direction indicated by an arrow A shown in FIG. 3A, whereby the random polarized light is split into the P wave and the S wave.

Furthermore, in a case where the optical member 3 is formed as a dichroic block so as to have a characteristic of a dichroic filter, it is possible to compose rays of two colors and allow the composite light to emerge in the direction indicated by the arrow B by transmitting a predetermined color component of light incident in the direction indicated by the arrow A in the direction indicated by the arrow B, for example, and reflecting another color component in the direction indicated by the arrow C to split and emerge or transmitting color components of light incident in the direction indicated by the arrow A, for example, and reflecting color components of light incident in a direction indicated by an arrow D.

Though it is not physically impossible to bring the prisms 2a and 2b into close contact with the optical member 3 as they are, they can easily be fixed, for example, with a liquid or a cementing material.

Since deformation is caused due to a difference in coefficients of thermal expansion between a plastic material and glass or nonuniformity is produced due to rotation of a polarized wavefront when the plastic material is birefringent, it is preferable to use, as a cementing agent, a material which hardly allows birefringence to be produced against a pressure to be applied at a thermal expansion time or a material which forms soft cemented surfaces and hardly allows deformation to be caused by absorbing stresses produced by thermal expansion of the plastic material and glass. An ultraviolet curing resin of a photopolymerization type or the similar material may be used as such a cementing agent.

(2) Application Examples of the Optical Block

Figure 1:
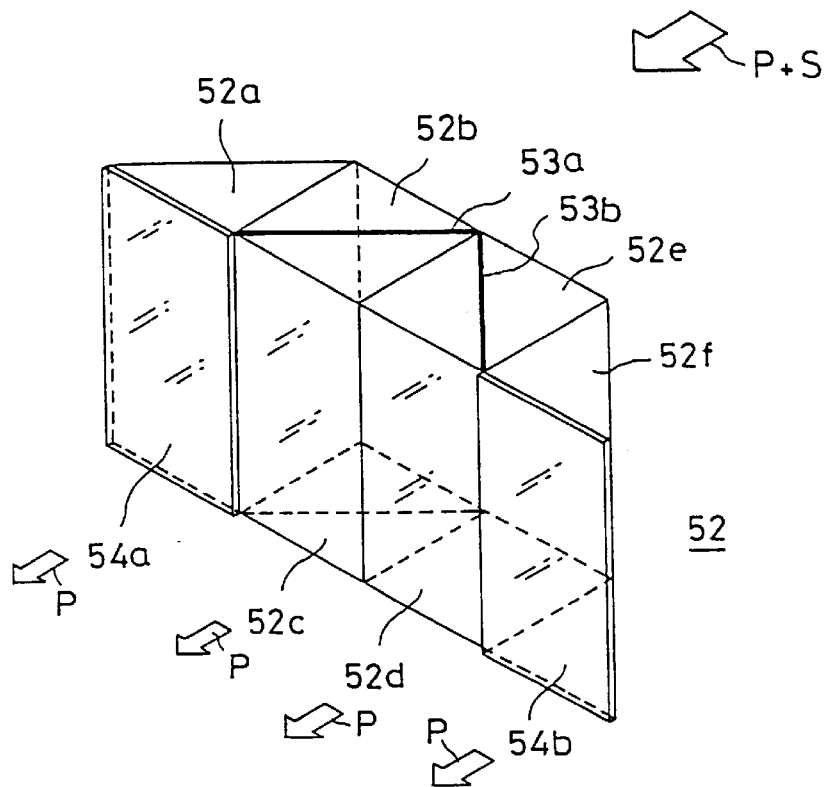
FIG. 1 is a perspective view showing an example of the conventional polarizing splitter block.
Figure 2:
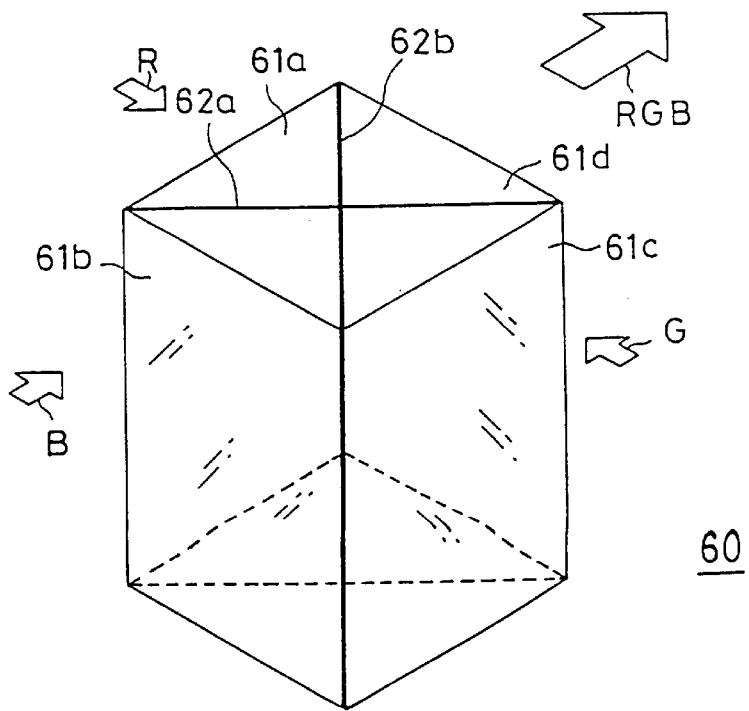
FIG. 2 is a perspective view showing an example of the conventional monochromator prism block.
Figure 4:
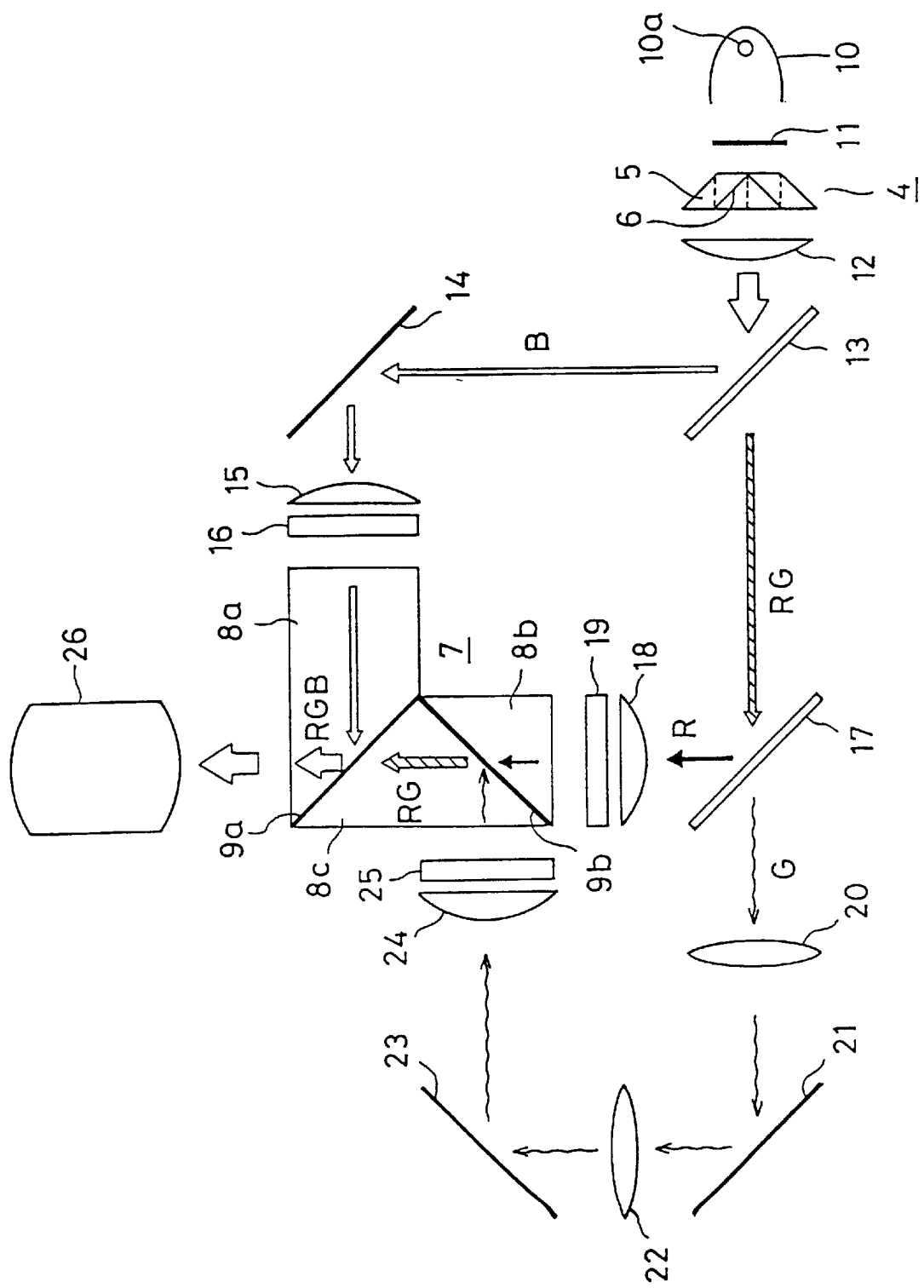
FIG. 4 is a diagram showing one example of the optical system in a liquid crystal projector using the optical block according to the embodiment.

FIG. 4 is a plan view schematically showing an optical system of a three-panel type liquid crystal projector which adopts the optical blocks according to the present invention as a polarizing splitter block (for splitting into the P and S waves) and a dichroic block (for color composition). A polarizing splitter block 4 shown in FIG. 4 is assembled similarly to the polarizing splitter block 52 shown in FIG. 1 by disposing prisms 5 made, for example, of a plastic material and a plurality of optical members 6 having optical thin films composed of PBSs, and is configured so as to allow only the P wave to emerge forward using a mirror which reflects the S wave reflected by the optical members 6 on a side of emergence and a ½λ plate which polarizes the S wave reflected by the mirror (both the mirror and the ½λ plate not shown).

Furthermore, a dichroic block 7 has an outside form which is composed of a polyhedron 8a which is made of a plastic material and has a surface of incidence for the blue ray B, a polyhedron 8b which has a surface of incidence for the red ray R and a polyhedron 8c which has a surface of incidence for the green ray G. The polyhedrons 8a to 8c are made of a transparent plastic material and coupled by way of optical members 9a and 9b which are configured as dichroic filters.

A light source 10, for example, a metal halide lamp 10a, is disposed at a location of a focal point of a parabolic mirror so that rays which are substantially in parallel with an optical axis of the parabolic mirror emerge from an opening thereof. Out of rays emitted from the light source 10, unwanted rays in the infrared and ultraviolet regions are intercepted by a UV-IR cut filter 11 so that only effective rays are led to the polarizing splitter block 4.

Only the P wave emerges from the polarizing splitter block 4 as already described above and irradiates liquid crystal panels 16, 19 and 25 after passing through various kinds of optical elements such as a condenser lens 12 which condenses a light bundle onto an effective opening of the liquid crystal panels and a dichroic mirror which decomposes light into R, G and B colors.

In the example shown in this drawing, the blue ray B is reflected first by a dichroic mirror 13, whereas the red ray R and green ray G are allowed to pass therethrough. The blue ray B which is reflected by the dichroic mirror 13 is deflected 90-degree in its travelling direction by a mirror 14, converged by a condenser lens 15 and incident onto the liquid crystal panel 16 for blue.

On the other hand, the red ray R and the green ray G which are allowed to pass through the dichroic mirror 13 are split by a dichroic mirror 17. Speaking concretely, the red ray R is reflected so as to be deflected 90-degree in its travelling direction and led to the liquid crystal panel 19 for red by way of a condenser lens 18. The green ray G transmits through the dichroic mirror 17, travels straight, and is led to the liquid crystal panel 25 for green by way of a relay lens 20, a mirror 21, a relay lens 22, a mirror 23 and a condenser lens 24.

Polarizing plates (not shown) which transmit rays having a constant polarized wavefront are arranged at stages preceding the liquid crystal panels 16, 19 and 25, and polarizing plates which transmit only rays having a predetermined wavefront out of emerging rays are arranged at stages following the liquid crystal panels so that a transmission characteristic of the rays is modulated depending on a voltage from the circuits which drive the liquid crystals with video signals and so on.

The three colors which have been subjected to light modulation by the liquid crystal panels 16, 19 and 25 are composed by the dichroic block 7. In this dichroic block 7, the blue ray B is reflected by the optical member 9a, whereas the red ray R transmits through the optical members 9a and 9b. Furthermore, the green ray G is reflected by the optical member 9b and then transmits through the optical member 9a, whereby the rays R, G and B are composed so as to have a single optical axis and allowed by a projector lens 26 to emerge for projecting a magnified colored image to a screen which is not shown.

Working of individual parts is facilitated by arranging the prisms 5 and the polyhedrons 8 (a, b and c) made of a transparent plastic material on surfaces of the optical member 6 and the optical members 9 (a and b) which have the polarizing splitter blocks 4 and the dichroic block 7 composed of the plate-like glass members.

Speaking of the dichroic block 7, it can shorten distances from the projector lens 26 to the liquid crystal panels 16, 19 and 25, i.e., back focal lengths.

(3) Modification Examples of the Dichroic Block

Now, description will be made of configurations and optical paths in modification examples wherein the optical block according to the present invention is configured as a dichroic block.

Figure 5A:
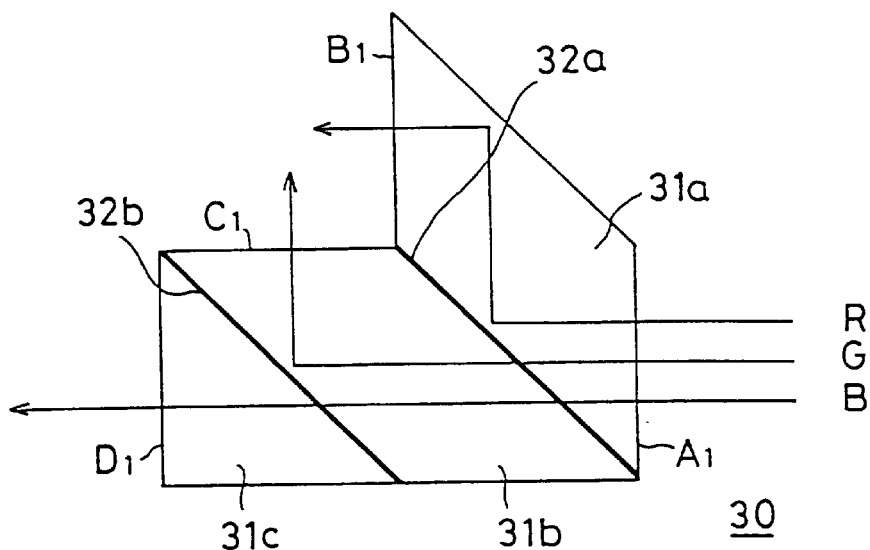
FIGS. 5A to 5C show plan views illustrating a modification example of the optical block according to the embodiment.
Figure 5B:
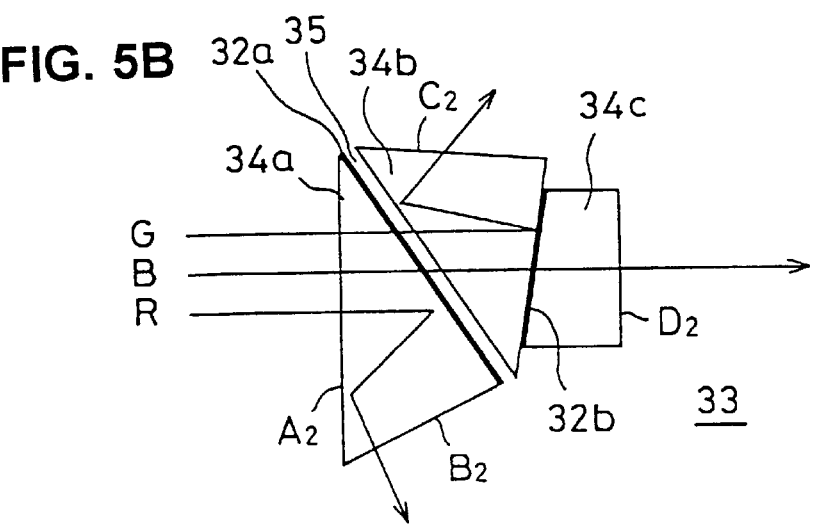
Figure 5C:
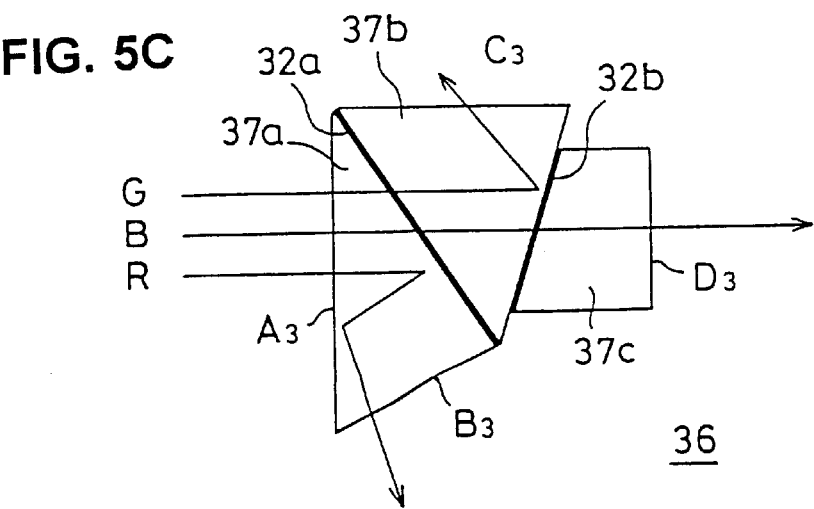

FIGS. 5A to 5C show plan views and diagrams illustrating monochromator prism blocks as modification examples of the dichroic block and optical paths thereof. Each of polyhedrons shown in these drawings is made of a transparent plastic material and dichroic filters are formed as optical thin films on optical members, for example, by vapor deposition.

A monochromator prism block 30 shown in FIG. 5A has an outside form composed of a polyhedron 31a which has a surface of incidence Al for a white light and a surface of emergence B1 for the red ray R, a polyhedron 31b which has a surface of emergence Cl for the green ray G and a polyhedron 31c which has a surface of emergence D1 for the blue ray B. These polyhedrons 31a, 31b and 31c are coupled by way of optical members 32a and 32b on which dichroic filters are formed. Furthermore, the polyhedrons 31a to 31c are configured so as to have such forms as to set the optical members 32a and 32b at predetermined angles relative to incident rays.

Out of while light (RGB) incident from the surface of incidence $A_1$, the red ray R is reflected by the optical member 32a. The red ray R reflected by the optical member 32a is reflected by an end surface of the polyhedron 31a and emerges from the surface of emergence $B_1$. The green ray G which transmits through the optical member 32a is reflected by the optical member 32b and emerges from the surface of emergence $D_1$. Furthermore, the blue ray B transmits through the optical members 32a and 32b, and emerges from the surface of emergence $D_1$. Accordingly, the white light (RGB) which is incident on the surface of incidence $A_1$, is decomposed into the different colors, which emerge from the surfaces of emergence $B_1$, $C_1$ and $D_1$ respectively.

A monochromator prism block 33 of a type which has a spatial layer and is used, for example, in color decomposing system of a camera is shown in FIG. 5B. This monochromator prism block 33 has an outside form composed of a polyhedron 34a which has a surface of incidence $A_2$ for white light and a surface of emergence $B_2$ for the red ray R, a polyhedron 34b which has a surface of emergence $C_2$ for the green ray G, and a polyhedron 34c which has a surface of emergence $D_2$ for the blue ray B. Though these polyhedrons 34a to 34c are coupled by way of optical members 32a and 32b, a spatial layer 35 is reserved between the optical member 32a and the polyhedron 34b in the monochromator prism block 33. The spatial layer 35 is formed, for example, by disposing a wire on the order of microns at a location not hindering rays between the optical member 32a and the polyhedron 34b so as to form a space corresponding to a diameter of the wire.

When white light (RGB) is incident from the surface of incidence $A_2$, the red ray R is first reflected by the optical member 32a. The red ray R reflected by the optical member 32a is reflected by an end surface of the polyhedron 34a and emerges from the surface of emergence $B_2$. The green ray G which has transmitted through the optical member 32a is reflected by the optical member 32b, then reflected by an end surface of the polyhedron 34b on which the spatial layer 35 is formed and emerges from the surface of emergence $C_2$. Furthermore, the blue ray B transmits through the optical members 32a and 32b, and emerges from the surface of emergence $D_2$. The rays emerging in the conditions decomposed into the different colors are incident onto CCDs (charge coupled devices) corresponding to the colors but not shown.

Like the monochromator prism block 33, a monochromator prism block 36 shown in FIG. 5C is used, for example, also in a color decomposing system of a camera but has a composition wherein polyhedrons 37a, 37b, 37c and optical members 32a, 32b are kept in close contact with one another without forming a spatial layer.

Out of white light (RGB) incident from the surface of incidence $A_3$, the red ray R is reflected by the optical member 32a. The red ray reflected by the optical member 32a is reflected by an end surface of the polyhedron 37a and emerges from a surface of emergence $B_3$. The green ray G which has transmitted through the optical member 32a is reflected by the optical member 32b and then emerges from a surface of emergence $C_3$. Furthermore, the blue ray B transmits through the optical members 32a and 32b, and emerges from a surface of emergence D3. The rays emerging from the surfaces of emergence are incident on CCDs as in the monochromator prism block 33.

Optical paths which are traced with arrows in these drawings are those for decomposing incident white light (RGB) into rays of the primary colors R, G and B and it is possible to compose the rays of the primary colors R, G and B by tracing these optical paths in the reverse directions.

Figure 6:
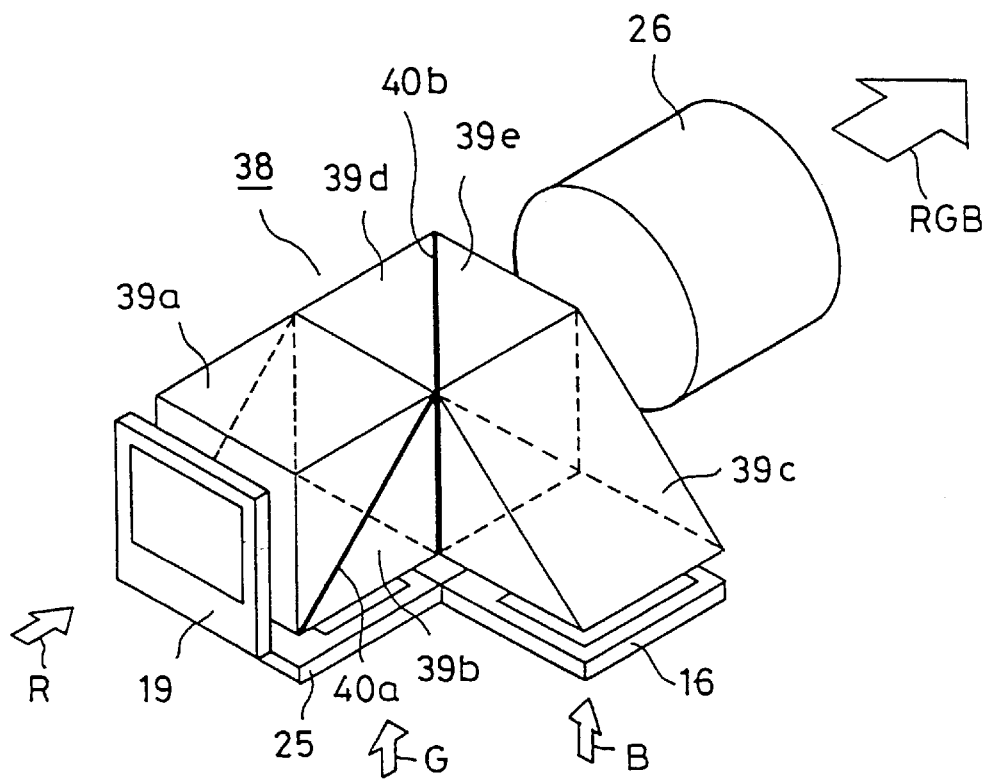
FIG. 6 is a perspective view illustrating a modification example of the optical block according to the embodiment.

FIG. 6 is a perspective view illustrating a dichroic prism block 38, liquid crystal panels 16, 19 and 25, and a projector lens 26 which are used, for example, in a color composing system of a liquid crystal projector.

The dichroic prism block 38 shown in FIG. 6 has an outside form which is composed of prisms 39a through 39e made of a plastic material, an optical member 40a configured as a dichroic filter is disposed between the prisms 39a and 39b, and an optical member 40b is disposed between the prisms 39d and 39e so that rays of colors R, G and B are incident cubically in three directions.

The red ray R which has been subjected to light modulation by the liquid crystal panel 19 and incident on the prism 39a and transmitted through the optical member 40a, further passes through the optical member 40b and emerges from a surface of emergence of the prism 39e which is opposed to the projector lens 26. The green ray G which has been subjected to light modulation by the liquid crystal panel 25 and incident on the prism 39b is reflected by the optical member 40a and transmitted through the optical member 40b and emerges from the surface of emergence of the prism 39e described above. That is to say, the red ray R and the green ray G are composed by the optical member 40a.

Furthermore, the blue ray B which has been subjected to light modulation by the liquid crystal panel 16 and incident on the prism 39c is reflected by an end surface of the prism 39c, further reflected by the optical member 40b and emerges from the surface of emergence of the prism 39e which is described above. Accordingly, the rays R, G and B are composed by the optical member 40b and projected by way of the projector lens 26.

(4) Other Embodiments of the Optical Block

Figure 7:
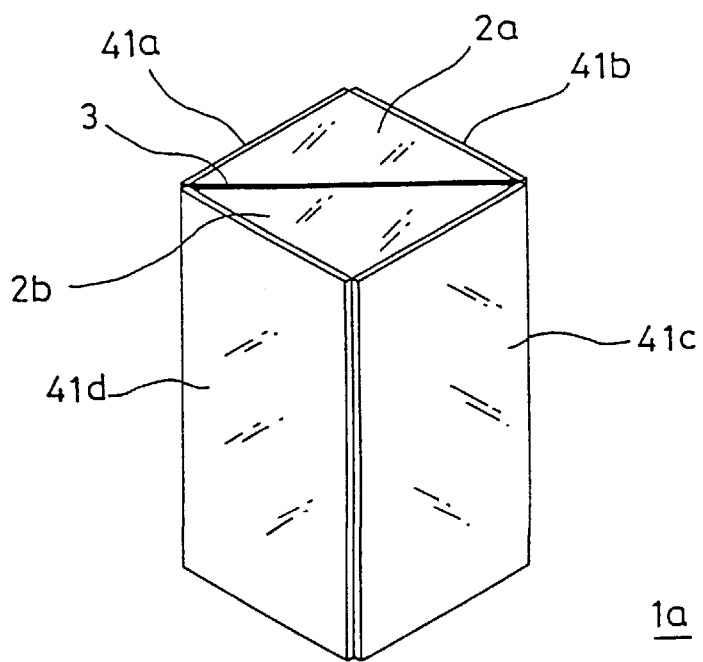
FIG. 7 is a perspective view illustrating the structure of another embodiment of an optical block according to the present invention.

FIG. 7 is a perspective view illustrating another embodiment of the optical block according to the present invention.

An optical block 1a shown in FIG. 7 has a composition which is substantially the same as that of the optical block 1 shown in FIGS. 3A and 3B but uses glass plates 41a to 41d which are cemented to end surfaces of prisms 2a and 2b.

These glass plates 41a to 41d are used for maintaining precision of the end surfaces of the prisms 2a and 2b which are molded, for example, with metal dies. When the optical block 1a is to be used as a monochromator prism block, a color purity can be enhanced by composing the glass plates 41a to 41d of colored glass plates.

Furthermore, the glass plates 41a to 41d may be cemented to the surfaces of incidence $A_1$ to $A_3$ and/or the surfaces of emergence $B_1$ to $B_3$, $C_1$ to $C_3$ and $D_1$ to $D_3$ of the polyhedrons which compose the optical blocks 30, 33, 36 and 38 described with reference to FIGS. 5A to 5C and FIG. 6. In this case, the glass plates are cemented, like the prisms 2a, 2b and the optical member 3, with an ultraviolet curing resin, for example, of a photopolymerization type.

By cementing the glass plates 41a to 41d to the prisms and the polyhedrons, it is possible to enhance the surface precision of the plastic members that were molded, for example, with metal dies so that they have functions equivalent to those of prisms and polyhedrons made of glass which are polished after working.

As understood from the foregoing description, the optical block according to the present invention is composed of glass members on which optical thin films are formed, prisms or polyhedrons which are configured as transparent plastic members and so on, whereby the optical block can be lighter in weight than an optical block which uses prisms, etc. made of glass. Furthermore, the plastic prisms or polyhedrons which can be molded with metal dies permit omitting steps of polishing, etc. and facilitating working.

Furthermore, the present invention provides a merit to permit shortening optical path distances by arranging prisms, polyhedrons, etc. on surfaces of incidence and surfaces of emergence of glass members.

While there has been described in connection with the preferred embodiments of the invention, it will be obvious to those skilled in the art that various changes and modifications may be made, therefore it is an object, to cover in the appended claims all such changes and modifications as fall within the true spirit and scope of the invention.

What is claimed is:

1. An optical block composed of:
   a plate-like glass member on which an optical thin film having a predetermined light transmitting characteristic is laminated; and
   two transparent plastic members respectively formed of polyhedrons arranged to sandwich said plate-like glass member and to be in contact with said plate-like glass member; and an ultraviolet light curing resin of a photo polymerization type for cementing said two transparent plastic members to said plate-like glass member for preventing bi-refringence caused by a difference in coefficients of thermal expansion between said two plastic members and said plate-like glass member.

2. The optical block according to claim 1 wherein; said optical thin film is formed as polarizing beam splitter.

3. The optical block according to claim 1 wherein; said optical thin film is formed as a dichroic filter.

4. The optical block according to claim 1 wherein; said two plastic members are each composed of trigonal prisms.

5. The optical block according to claim 1 wherein;
said glass member and said two plastic members are cemented to each other with a photo-setting resin.

6. The optical block according to claim 1 wherein;
colored glass plates are respectively cemented to one of surfaces of light incidence and surfaces of light emergence of said two plastic members, said colored glass plates being of different respective colors and forming color filters.

7. A liquid crystal projector for leading three primary color lights into three corresponding liquid crystal panels for modulation, synthesizing three modulated primary color lights therefrom, and projecting synthesized light, the projector comprising:
deflecting and separating means for deflecting light from a light source, said light having fixed wavefronts;
separating means for separating light emerged from said deflecting and separating means into three primary color lights;
leading means for respectively leading each of said three separated lights to said three liquid crystal panels for modulation;
synthesizing means for synthesizing modulated lights emerged from said three liquid crystal panels into a synthesized light; and
projecting means for projecting said synthesized light onto a screen, wherein
said deflecting and separating means is formed of a plate-like glass member on which is laminated an optical thin film having a light transmitting characteristic of a deflection beam splitter sandwiched and in contact with a plurality of first plastic members, and said synthesizing means is formed of a plate-like glass member on which is laminated an optical thin film having a light transmitting characteristic of a dichroic filter sandwiched and in contact with a plurality of second plastic members, wherein
said plate-like glass member and said plurality of first plastic members of said deflecting and separating means are cemented to each other with an ultraviolet light curing resin of a photopolymerization type and said plate-like glass member and said plurality of second plastic members of said synthesizing means are cemented to each other with said ultraviolet light curing resin.

8. The liquid crystal projector according to claim 7, wherein;
said plate-like glass member and said plurality of first plastic members of said deflecting and separating means are cemented to each other with a photo setting resin and said plate-like glass member and said plurality of second plastic members of said synthesizing means are cemented to each other with said photo setting resin.

* * * * *